United States Patent
Wilhelm

(10) Patent No.: US 7,624,446 B1
(45) Date of Patent: Nov. 24, 2009

(54) EFFICIENT SIGNATURE PACKING FOR AN INTRUSION DETECTION SYSTEM

(75) Inventor: Jeffrey Wilhelm, Los Angeles, CA (US)

(73) Assignee: Symantec Corporation, Cupertino, CA (US)

( * ) Notice: Subject to any disclaimer, the term of this patent is extended or adjusted under 35 U.S.C. 154(b) by 873 days.

(21) Appl. No.: 11/043,649

(22) Filed: Jan. 25, 2005

(51) Int. Cl.
*G06F 11/00* (2006.01)

(52) U.S. Cl. ............... 726/23; 726/22; 713/150; 713/187; 380/255; 709/224

(58) Field of Classification Search ............. 726/22–25; 713/187–188
See application file for complete search history.

(56) References Cited

U.S. PATENT DOCUMENTS

| | | | |
|---|---|---|---|
| 5,532,694 A * | 7/1996 | Mayers et al. ............. 341/67 |
| 5,920,900 A * | 7/1999 | Poole et al. ............... 711/216 |
| 6,052,697 A * | 4/2000 | Bennett et al. ............ 707/205 |
| 6,064,671 A * | 5/2000 | Killian .................... 370/389 |
| 6,115,802 A * | 9/2000 | Tock et al. ............... 711/216 |
| 6,279,113 B1 * | 8/2001 | Vaidya .................... 726/23 |
| 6,289,375 B1 * | 9/2001 | Knight et al. ............. 709/217 |
| 6,584,565 B1 | 6/2003 | Zamek |
| 6,754,662 B1 * | 6/2004 | Li ........................ 707/101 |
| 6,910,118 B2 * | 6/2005 | Kagawa .................. 711/216 |
| 7,039,950 B2 * | 5/2006 | Parekh et al. ............. 726/6 |
| 7,069,268 B1 * | 6/2006 | Burns et al. .............. 707/10 |
| 7,328,349 B2 * | 2/2008 | Milliken .................. 713/181 |
| 7,394,809 B2 * | 7/2008 | Kumar et al. ............. 370/392 |
| 2002/0169937 A1 * | 11/2002 | Kagawa ................... 711/206 |
| 2003/0066033 A1 * | 4/2003 | Direen et al. ............. 715/513 |
| 2003/0149887 A1 | 8/2003 | Yadav |
| 2003/0154399 A1 * | 8/2003 | Zuk et al. ................ 713/201 |
| 2003/0236992 A1 | 12/2003 | Yami |
| 2004/0049693 A1 | 3/2004 | Douglas |
| 2004/0083347 A1 * | 4/2004 | Parson .................... 711/165 |
| 2004/0250114 A1 * | 12/2004 | Parekh et al. ............. 713/201 |
| 2005/0108617 A1 * | 5/2005 | Lappin, Jr. .............. 714/781 |
| 2005/0141519 A1 * | 6/2005 | Rajgopal et al. ......... 370/395.32 |
| 2005/0270984 A1 * | 12/2005 | Kodialam et al. .......... 370/252 |
| 2005/0270985 A1 * | 12/2005 | Hao et al. ............... 370/252 |
| 2006/0143168 A1 * | 6/2006 | Rossmann ................ 707/4 |
| 2006/0149914 A1 * | 7/2006 | Doris ..................... 711/172 |

* cited by examiner

*Primary Examiner*—Kimyen Vu
*Assistant Examiner*—April Y Shan
(74) *Attorney, Agent, or Firm*—Fenwick & West LLP

(57) ABSTRACT

A flow assignment module identifies different network flows' characteristics and the characteristics of the signatures for the different network flows. Based on the identified characteristics, the flow assignment module assigns a network flow to a hash table among a small set of hash tables for storing signatures for that network flow. The flow assignment module assigns the network flow in such a way to minimize the likelihood that a signature for the network flow is hashed to a table entry that frequently occurs in a different network flow assigned to the same hash table. The flow assignment module identifies a hash table for the network flow where there is the least overlap between a signature for that network flow and a frequent byte in another network flow.

17 Claims, 7 Drawing Sheets

EFFICIENT SIGNATURE PACKING FOR AN INTRUSION DETECTION SYSTEM

BACKGROUND OF THE INVENTION

1. Field of the Invention

This invention pertains in general to computer security and in particular to techniques for storing signatures representative of malicious behaviors for an intrusion detection system.

2. Background Art

Intrusion detection systems (or intrusion prevention systems) examine network flows arriving at an enterprise to detect various unusual or suspicious data streams (e.g., viruses, hacker attacks, attempts to look for a vulnerability in the enterprise, or other indications of malicious activity). A network flow is defined by a tuple comprising an origination port, a destination port, and a communications protocol. A data stream is the stream of data packets sent over a network flow. Typically, an intrusion detection system stores a set of signatures representative of malicious behaviors. Each network flow may have its own unique set of signatures. The intrusion detection system detects an unusual or suspicious data stream by comparing a data stream with the stored signatures to determine if the data stream has a pattern that is characterized by one or more of the signatures.

To increase an intrusion detection system's efficiency, it is desirable to store a given network flow's signatures within a single data structure (e.g., a hash table) to minimize the lookup time for comparing the signatures with a data stream. Specifically, since there may be thousands of data streams arriving at an enterprise at any given second, inefficient signature lookup may cause the enterprise's users to experience a slow network connection. However, since there may be thousands of possible network flows directed to the enterprise, storing signatures for each network flow in a separate data structure may not be practical due to limited storage resources. In particular, creating a data structure such as a hash table for each network flow leads to a large signature file that is costly to distribute and to store in a memory. Thus, to preserve the storage resources, it may be desirable to create a data structure that stores multiple network flows' signatures. In other words, the intrusion detection system uses a small set of data structures that are globally shared among different network flows' signatures.

Storing multiple network flows' signatures in a single hash table creates an additional overhead. Specifically, the intrusion detection system uses the hash table to determine if a given byte sequence in a network flow matches a byte sequence of a signature for that network flow. However, since the hash table is shared among different network flows, if the intrusion detection system detects a match in the hash table, it needs to determine if the match identifies a signature for the current flow rather than for one of the other network flows that share the same hash table. In addition, storing signatures for different network flows in a single hash table may cause a signature for a network flow to be hashed to the same table entry as a frequently occurring byte in a different network flow. For example, in a hash table storing signatures for both file transfer protocol (FTP) flows and hypertext transfer protocol (HTTP) flows, a signature for the FTP flows may be hashed to the same table entry as 0x20, which is a byte that frequently occurs in the HTTP flows. In such a scenario, hash table lookups may lead to false hits during the scanning of a network flow, since the hash table may store another network flow's signature that has the same byte as the frequently occurring byte of the network flow being scanned.

Therefore, there is a need in the art for a technique to store intrusion detection signatures in such a way that reduces the number of unnecessary lookups during scanning without introducing additional storage overheads.

DISCLOSURE OF INVENTION

The above need is met by a flow assignment module that identifies different network flows' characteristics (e.g., a byte frequency distribution of a data stream within a network flow) as well as the characteristics of the signatures for the different network flows. Based on the identified characteristics, the flow assignment module assigns a network flow to a hash table for storing signatures for that network flow. For example, the flow assignment module hashes one or more bytes of a signature to identify an entry in the assigned hash table and stores the signature in that entry. The flow assignment module assigns the network flow in such a way to minimize the likelihood that a signature for the network flow is hashed to a table entry that frequently occurs in a different network flow assigned to the same hash table. In an embodiment, the flow assignment module identifies a hash table for the network flow where there is the least overlap between a signature for that network flow and a frequent byte in another network flow. An embodiment of the invention uses a small set of hash tables to store signatures for different network flows. The embodiment assigns each network flow's signatures to one hash table in the set such that the intrusion detection system's performance is maximized.

In an embodiment of the invention, a scanning module scans a data stream using a sliding window to identify one or more bytes of the data stream within the sliding window. A hash table lookup module hashes the bytes within the sliding window to identify an entry in the appropriate hash table and determines if the identified entry stores a signature. If the identified entry stores a signature, the hash table lookup module examines the stored signature to determine if the signature is applicable to the current data stream and if the data stream matches the signature. If there is a match, then the data stream may be malicious. If there is not a match or if the identified entry does not store a signature, the scanning module slides the window to scan subsequent bytes of the data stream for performing further hash table lookups.

The figures depict an embodiment of the present invention for purposes of illustration only. Alternative embodiments of the structures and methods illustrated herein may be employed without departing from the principles of the invention described herein.

DETAILED DESCRIPTION OF THE PREFERRED EMBODIMENTS

Figure 1:
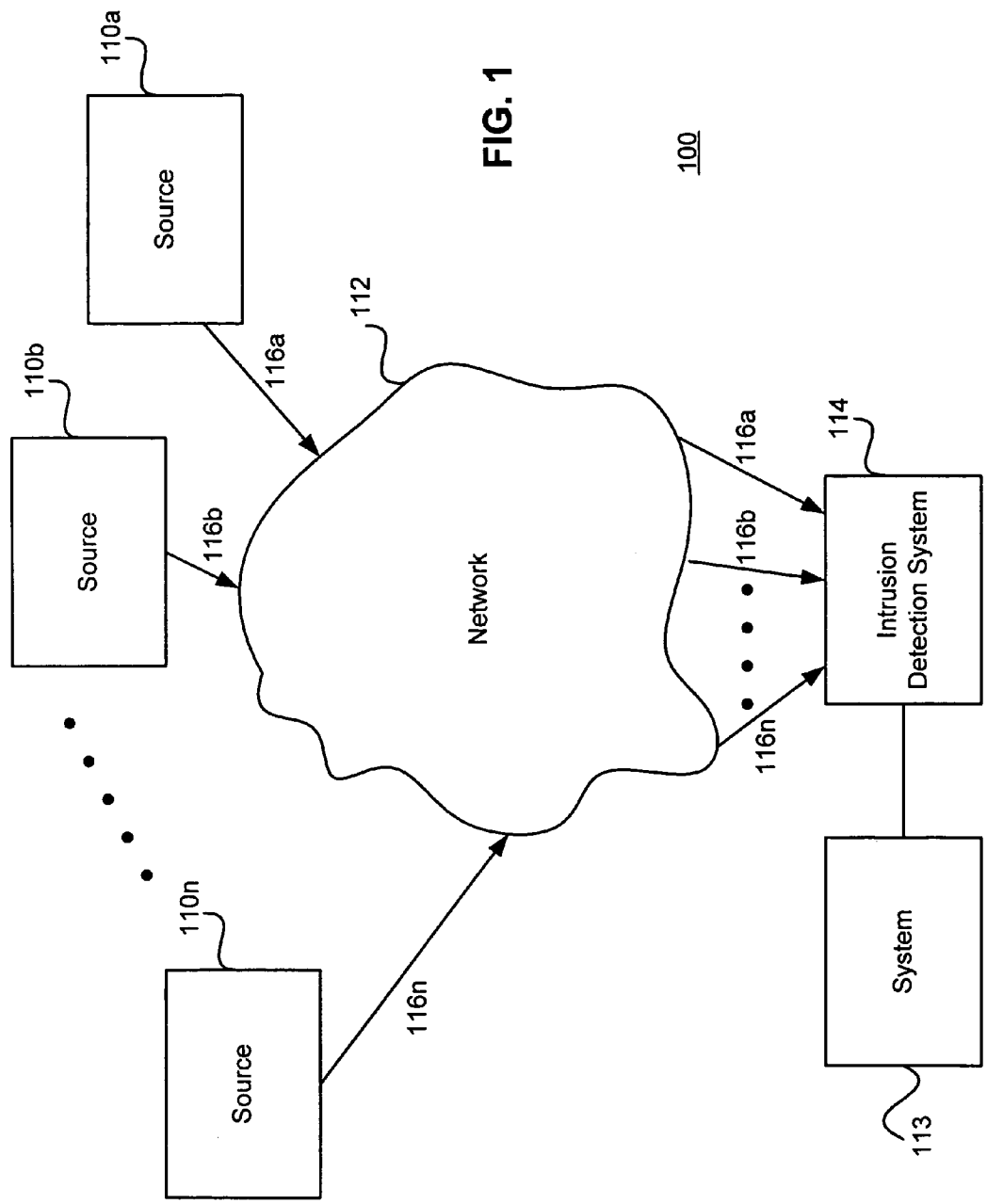
FIG. 1 is a high-level block diagram of a computing environment according to an embodiment of the present invention.

FIG. 1 is a high-level block diagram of a computing environment 100 according to an embodiment of the present invention. FIG. 1 illustrates one or more sources 110 connected to a network 112. A system 113 is also connected to the network 112 via an intrusion detection system 114. The system 113 may include one or more computer systems used by an enterprise's users to connect to the network 112. The intrusion detection system 114 is coupled to the system 113 to serve as an interface between the system 113 and the network 112. The intrusion detection system 114 analyzes network traffic from the network 112 to detect an unusual or suspicious data stream (e.g., a virus, a hacker attack, an attempt to look for a vulnerability, or other indication of malicious activity) directed to the system 113.

The network 112 provides communications between and among the other entities illustrated in the computing environment 100 of FIG. 1. In one embodiment, the network 112 is the Internet and uses wired and/or wireless links. The network 112 may include a cellular telephone network or other data network having a peering point with the Internet. The network 112 can also utilize dedicated or private communications links that are not necessarily part of the Internet. The entities illustrated in FIG. 1 use conventional communications technologies (e.g., the transmission control protocol/Internet protocol (TCP/IP)) to communicate over the network 112. The entities of FIG. 1 also use conventional communications protocols such as the HTTP, the simple mail transfer protocol (SMTP), the post office protocol version 3 (POP3), the Internet message access protocol (IMAP), the FTP, Telnet, etc. The entities can also engage in secure communications using technologies including the secure sockets layer (SSL), Secure HTTP and/or virtual private networks (VPNs). The communicated messages utilize conventional data encodings such as hypertext markup language (HTML), extensible markup language (XML), etc.

The one or more sources 110 can include one or more standard computer systems configured to communicate one or more network flows 116 to the system 113 using various communications protocols (e.g., HTTP, SMTP, POP3, IMAP, FTP, Telnet, etc.) over the network 112. In an embodiment of the invention, each network flow 116 is defined by a tuple comprising an origination port, a destination port, and a communications protocol. A single source 110, by using one or more of its origination ports and/or various possible communications protocols, can be an originator of multiple network flows 116 to the system 113. The system 113 can be a recipient of a network flow 116 using one or more of its destination ports. A data stream, in turn, is the stream of data packets sent over a network flow 116. The intrusion detection system 114 examines each network flow 116 to detect an unusual or suspicious data stream within the network flow 116.

In one embodiment, the intrusion detection system 114 is a conventional computer system executing, for example, a Microsoft Windows-compatible operating system (OS), Apple OS X, and/or a Linux-compatible OS. The system 113 can have one or more intrusion detection systems 114. There can be thousands or millions of systems 113 on the network 112, each with an intrusion detection system 114.

Although one intrusion detection system 114 is shown in FIG. 1, embodiments of the present invention can have thousands or millions of such intrusion detection systems 114 coupled to one or more systems 113.

Figure 2:
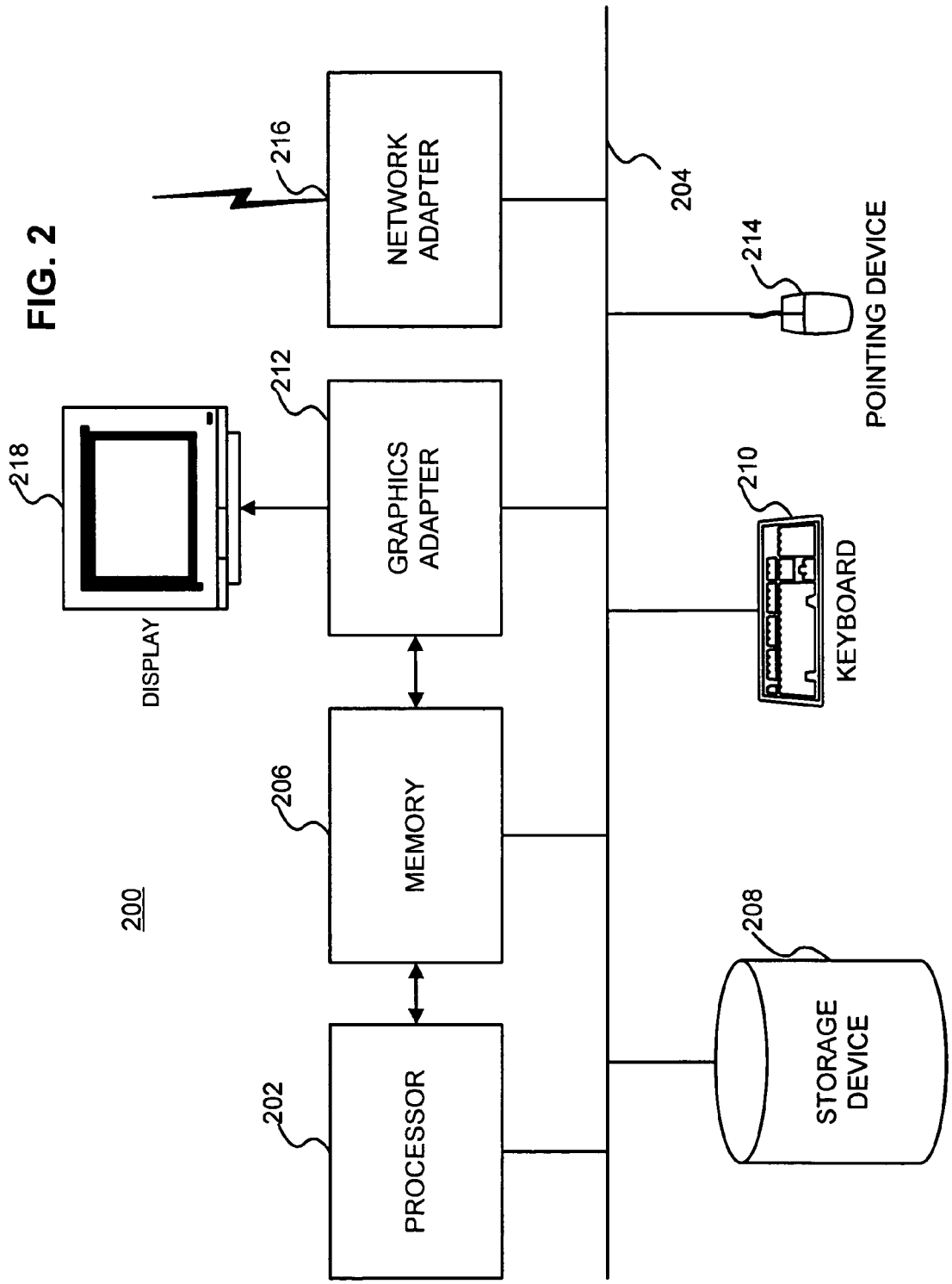
FIG. 2 is a high-level block diagram illustrating a functional view of a typical computer system acting as an intrusion detection system according to an embodiment of the present invention.

FIG. 2 is a high-level block diagram illustrating a functional view of a typical computer system 200 acting as the intrusion detection system 114 according to an embodiment of the present invention. Illustrated is a processor 202 coupled to a bus 204. Also coupled to the bus 204 are a memory 206, a storage device 208, a keyboard 210, a graphics adapter 212, a pointing device 214, and a network adapter 216. A display 218 is coupled to the graphics adapter 212.

The processor 202 may be any general-purpose processor such as an INTEL x86, SUN MICROSYSTEMS SPARC, or POWERPC compatible-CPU. The memory 206 may be, for example, firmware, read-only memory (ROM), non-volatile random access memory (NVRAM), and/or RAM, and holds instructions and data used by the processor 202. The storage device 208 is, in one embodiment, a hard disk drive but can also be any other device capable of storing data, such as a writeable compact disk (CD) or DVD, and/or a solid-state memory device. The storage device 208 stores multiple computer files. The pointing device 214 may be a mouse, track ball, or other type of pointing device, and is used in combination with the keyboard 210 to input data into the computer system 200. The graphics adapter 212 displays images and other information on the display 218. The network adapter 216 couples the intrusion detection system 114 with the network 112.

As is known in the art, the computer system 200 is adapted to execute computer program modules for providing functionality described herein. In this description, the term "module" refers to computer program logic for providing the specified functionality. A module can be implemented in hardware, firmware, and/or software. It will be understood that the modules described herein represent one embodiment of the present invention. Certain embodiments may include other modules. In addition, the embodiments may lack modules described herein and/or distribute the described functionality among the modules in a different manner. In one embodiment, the modules form a computer program product and are stored on a computer-readable storage medium such as the storage device 208, loaded into the memory 206, and executed by the processor 202.

Figure 3:
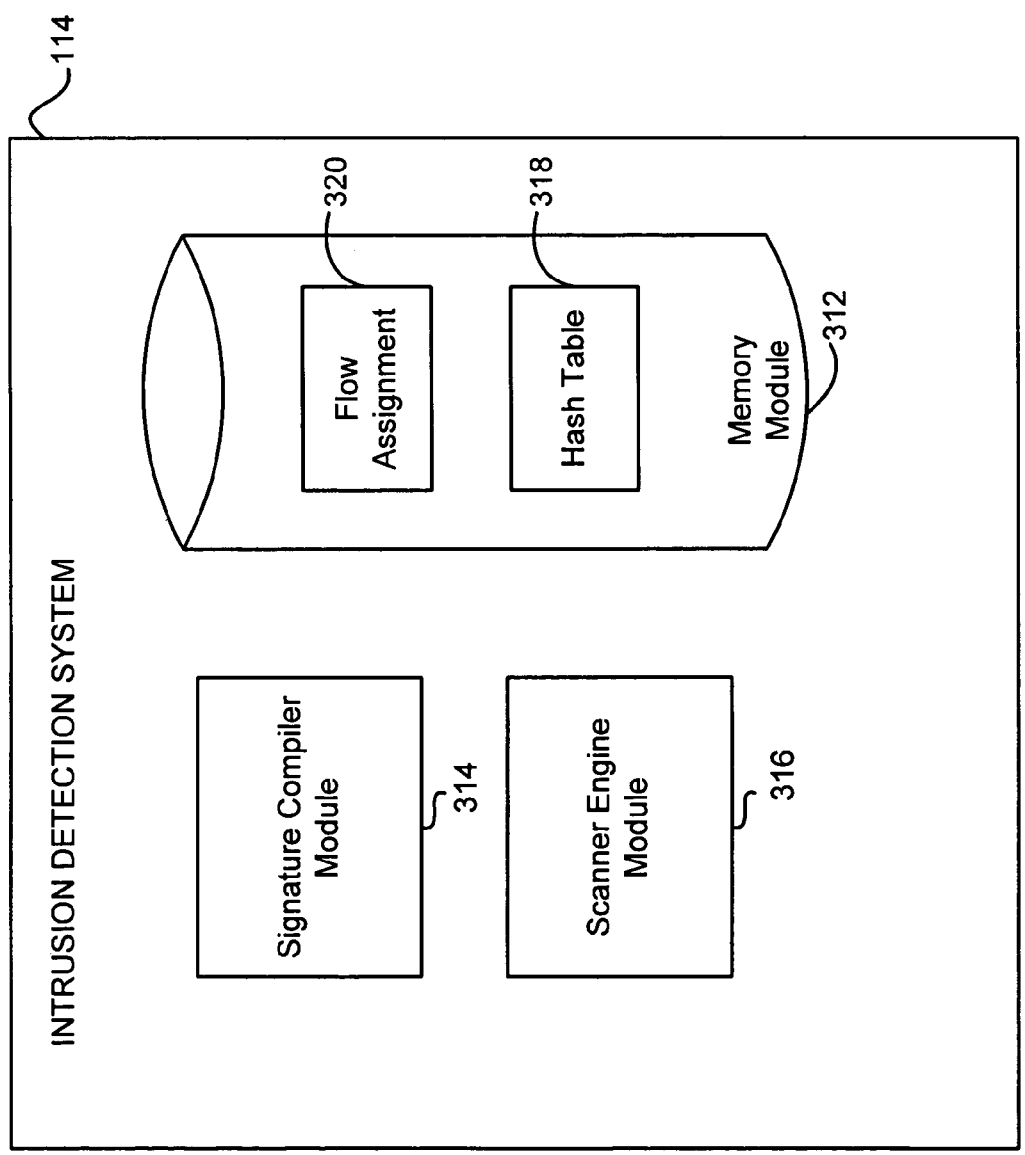
FIG. 3 is a high-level block diagram illustrating modules within an intrusion detection system according to an embodiment of the present invention.

FIG. 3 is a high-level block diagram illustrating modules within the intrusion detection system 114 according to an embodiment of the present invention. Other embodiments of the intrusion detection system 114 can have different and/or other modules than the ones described herein. In addition, the functionalities can be distributed among the modules in a manner different than described herein.

FIG. 3 illustrates a memory module 312 (e.g., located within the storage device 208), a signature compiler module 314, and a scanner engine module 316. An administrator defines a set of signatures that characterize different data streams of the network flows 116. Signatures may also be created by an intrusion detection system vendor or by a managed service provider.

Signatures identify malicious, suspicious, etc. data sequences within a data stream. Groups of signatures are associated with different network flows 116. For example, there can be a set of signatures for detecting attacks associated with the HTTP flow. Since signatures within a set may be associated with more than one network flow 116, a compiler of the intrusion detection system 114 computes the Cartesian product of different origination and destination ports to generate the set of signatures for each possible network flow 116.

This leads to a large number of possible signatures (especially if some signatures use wildcard or unspecified ports). These signatures are stored in a data structure such as a hash table 318 that allows quick lookup. This is done by applying a hash function to given bytes (e.g., the first two bytes) of a signature to identify an entry in the hash table 318 and storing the signature at that entry.

The signature compiler module 314 translates the set of signatures defined by the administrator into a signature file. According to an embodiment of the invention, the signature compiler module 314 stores the signature file in the memory module 312 according to a particular data structure such as a set of hash tables 318. For example, the signature compiler module 314 stores signatures for the network flows 116 as one or more entries in the hash tables 318. A particular hash table 318 can include signatures from multiple network flows 116. The signature compiler module 314 thus assigns a given network flow 116 to a particular hash table 318 (i.e., signatures for this given network flow 116 are stored in this particular hash table 318). The signature compiler module 314 stores the mapping between a network flow 116 and its assigned hash table 318 as a flow assignment 320 in the memory module 312.

Figure 4:
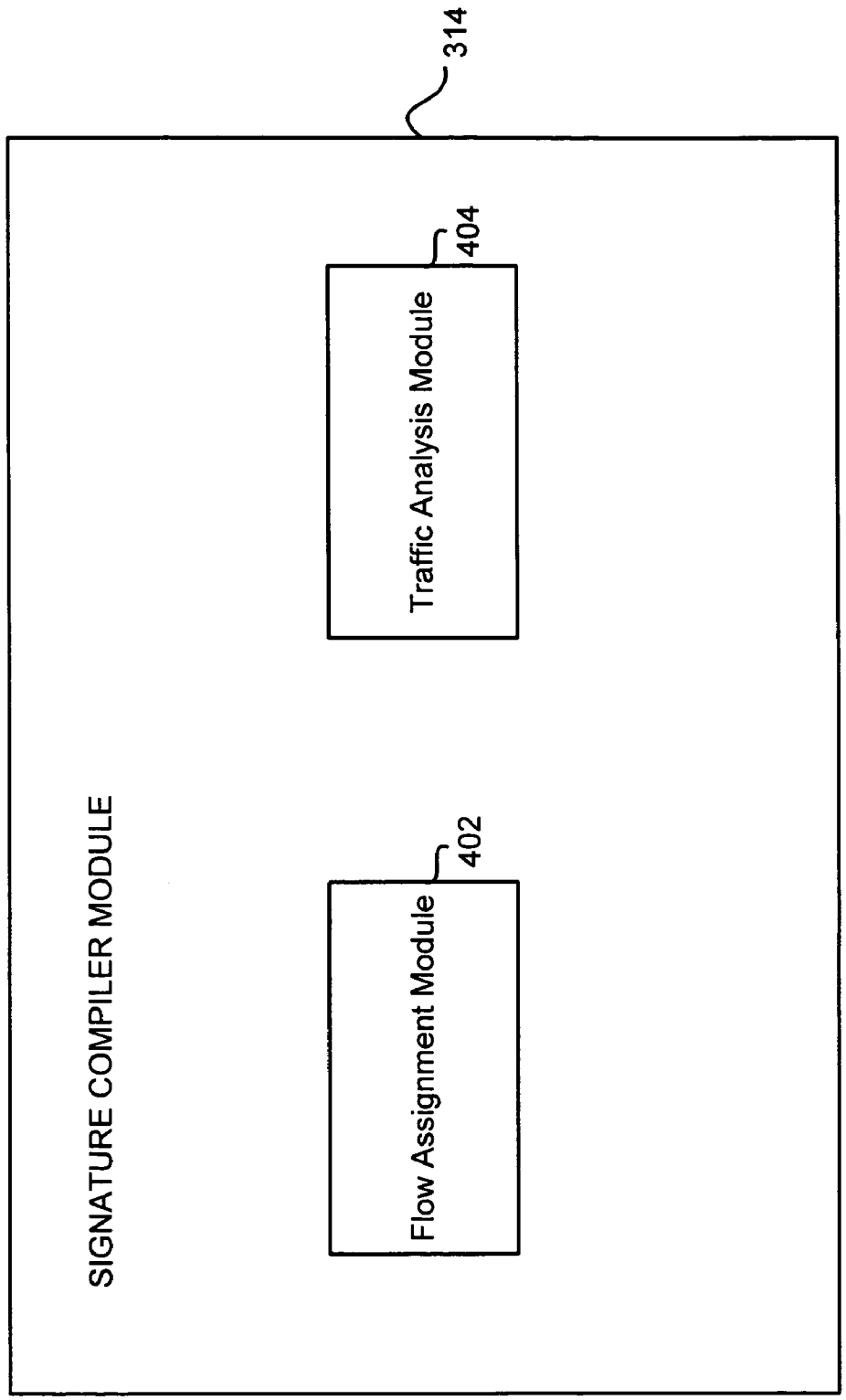
FIG. 4 is a high-level block diagram illustrating modules within a signature compiler module according to an embodiment of the present invention.

FIG. 4 is a high-level block diagram illustrating modules within the signature compiler module 314 according to an embodiment of the invention. The signature compiler module 314 can be located remotely from the intrusion detection system 114, and the functionalities provided by the signature compiler module 314 can be done offline or by another entity. As shown, the signature compiler module 314 includes a flow assignment module 402 and a traffic analysis module 404. The flow assignment module 402 specifies a network flow 116 (e.g., as defined by an origination port, a destination port, and a communications protocol) and its associated signatures. The flow assignment module 402 associates the network flow 116 to a particular hash table 318 and stores the signatures for the network flow 116 in the hash table 318 using a hash function.

The flow assignment module 402 assigns a network flow 116 to a hash table 318 based on characteristics of various network flows 116 and the signatures for these network flows 116. The traffic analysis module 404 analyzes a network flow 116 and signatures for the network flow 116 to identify their characteristics. The traffic analysis module 404 generates data that are utilized by the flow assignment module 402 to select a hash table 318 to store signatures detecting a given network flow 116. The data can come from a variety of sources, including automated analysis of the actual network flow traffic, human analysis of traffic characteristics (e.g., an analysis obtained by reviewing a request for comments (RFC)), etc. In an embodiment of the invention, the flow assignment module 402 determines a hash table 318 to assign a given network flow 116 such that storing signatures for the network flow 116 in the hash table 318 will reduce or minimize collisions in the hash table 318. For example, the flow assignment module 402 minimizes the likelihood that a hash function maps a signature for the network flow 116 to the same table address in the same hash table 318 as a signature for a different network flow 116. In addition, based on the characteristics of the various network flows 116 and of the signatures for the network flows 116, the flow assignment module 402 assigns a given network flow 116 to a hash table 318 such that a signature for the given network flow 116 is unlikely to be hashed into the same table address as a frequently occurring byte in a different network flow 116. Thus, the flow assignment module 402 identifies a hash table 318 for the given network flow 116 where there is the least overlap between a signature for the given network flow 116 and a frequent byte in another network flow 116.

In an embodiment, the traffic analysis module 404 determines the byte frequency differences of different network flows 116. These differences are exploited by the flow assignment module 402 to minimize the interdependence between a signature for a network flow 116 and the byte frequency distribution of another network flow 116. For example, certain communications protocols such as POP3, Telnet, and IMAP use a specific subset of the 256 possible byte values to transmit data. The text below provides two exemplary signatures, whose byte distributions reflect those of their corresponding network traffic.

Signature A
  BEGIN
    ID: 20282
    TUPLE
      Origination Port Any
      Destination Port: 2555
      Protocol: Any
    SIG-BEGIN
      "\xa9HaHa\x20\x3c\x2d\x2d\x2d\x20\x63\x28\x2a\
        x2e\x2a\x29\x63<reportid( )>"
    SIG-END
  END Signature B
  BEGIN
    ID: 20099
    TUPLE
      Origination Port Any
      Destination Port Any
      Protocol: POP3
    SIG-BEGIN
      "UgAAAAAAFgAAAFwAcgBlAGEA-
        ZABtAGUALgBlAHgAZQ
        AAAEYAaQBsAGUARQB4AGkAcwB0AHMAA
        AAA<reportid( )>"
    SIG-END
  END As shown, signature A begins with a non-ASCII byte (i.e., 0xa9), and signature B is used by the intrusion detection system 114 to scan POP3 network flows, which comprise mostly ASCII bytes. If the signature compiler module 314 uses the first two bytes of each signature as its hash function, signatures that begin with ASCII bytes will hash to different table entries than signatures that begin with non-ASCII bytes. During scanning of a POP3 network flow, the scanner engine module 316 slides through a data stream in the POP3 network flow and looks up each two-byte sequence of the data stream in the hash table 318. Since the POP3 network flow comprises mostly ASCII bytes, a non-ASCII byte such as 0xa9 appears infrequently in the POP3 network flow. Thus, the lookup of POP3 byte sequences in the hash table 318 is unlikely to trigger a hit to a signature that begins with a non-ASCII byte such as 0xa9. Therefore, adding a signature that starts with a non-ASCII byte to the hash table 318 is unlikely to result in a performance impact on the scanning of POP3 network flows. And the storage requirements may be reduced by combining two different network flows 116 into a single hash table 318 without a performance penalty.

Figure 5:
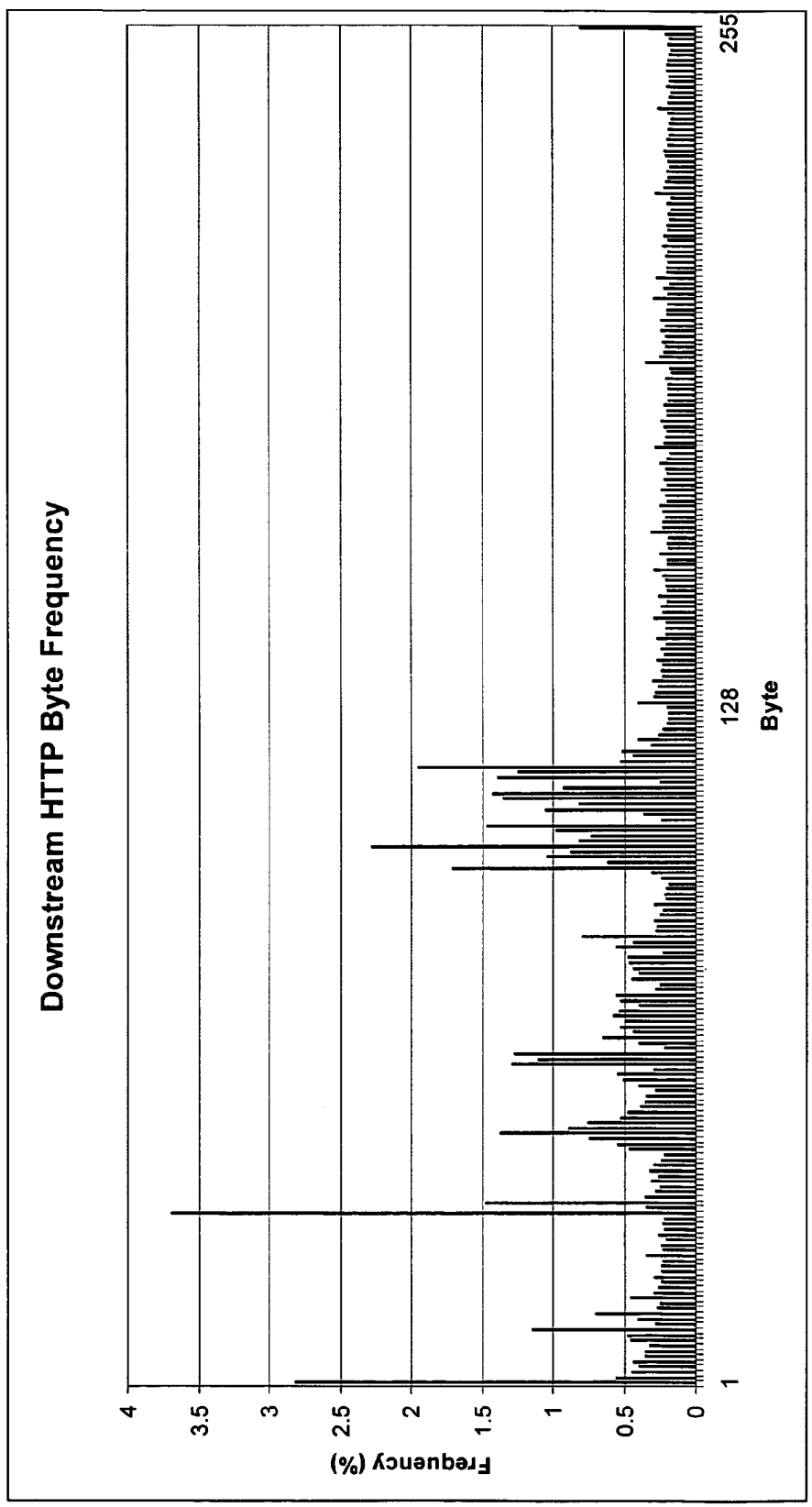
FIG. 5 is a graph illustrating an exemplary network flow's byte frequency distribution.

The traffic analysis module 404 analyzes traffic logs of various network flows 116 and identifies their characteristics such as byte frequency distributions. FIG. 5 is a graph illustrating an exemplary downstream HTTP flow's byte frequency distribution provided by the traffic analysis module

404. The traffic analysis module 404 provides such a characteristic of a network flow 116 to the flow assignment module 402. The flow assignment module 402 uses the characteristic to assign the network flow 116 to a particular hash table 318. For example, the flow assignment module 402 may examine the exemplary HTTP flow's byte frequency distribution and determine that several bytes (e.g., 0x00, 0x20, and 0x65) are 10 or 15 times more likely to occur in the HTTP flow than the less frequent bytes. Thus, by packing signatures for other network flows 116 that start with these less frequent bytes into the same hash table 318 as signatures for the exemplary HTTP flow, the flow assignment module 402 can exploit the uneven byte frequency distributions to minimize the possibility that the lookup of the HTTP flow will trigger a hit to the signatures that start with the less frequent bytes. Specifically, the frequently occurring bytes in the HTTP flow are unlikely to be hashed to the same table entries as signatures that start with the less frequent bytes. Thus, if the lookup of the HTTP flow in the hash table 318 results in a match to a signature being stored in the hash table 318, that signature is likely to be for the HTTP flow rather than for the other network flows 116 that start with these less frequent bytes. Accordingly, the flow assignment module 402 can minimize the signature interdependence without additional storage overheads.

There are several ways for the flow assignment module 402 to assign a given network flow 116 to a hash table 318. In one way, the flow assignment module 402 identifies a certain set network flows 116 using "critical" protocols where performance of the intrusion detection system 114 is desired to be maximized. For example, these critical protocols may be HTTP, POP3, and FTP. The traffic analysis module 404 provides the flow assignment module 402 with the exemplary byte frequency distribution of each network flow 116 using a critical protocol. The flow assignment module 402 then assigns each network flow 116 that uses a critical protocol to a unique hash table 318. For each of the remaining network flows 116 (i.e., network flows 116 that use non-critical protocols), the flow assignment module 402 compares signatures for the network flow 116 using a non-critical protocol with the byte frequency distribution of each network flow 116 that uses a critical protocol. The flow assignment module 402 then assigns the non-critical network flow 116 to the same hash table 318 as the critical network flow 116 that has the least byte frequency overlap with the signatures for the non-critical network flow 116.

In another way, the flow assignment module 402 uses the "first-fit, decreasing" algorithm to assign a network flow 116 to a hash table 318. Specifically, the flow assignment module 402 gives the signature set of each network flow 116 a weight based on the network flow's importance and the signature set's expected number of collisions. For example, signature sets of critical network flows 116 (e.g., those using critical communications protocols) may have higher weights than signature sets of non-critical network flows 116. Moreover, signature sets that have frequently occurring bytes (e.g., 0x00, 0x20, 0x65, etc.) may have higher weights due to their high collision possibilities. The flow assignment module 402 sorts the network flows 116 in decreasing order of their signature weights and assigns each hash table 318 a fixed capacity. The flow assignment module 402 then iterates through the sorted network flows 116 and assigns a network flow 116 to the first hash table 318 that has enough remaining capacity for its signature weight. If no hash table 318 can accommodate the particular network flow 116, then the flow assignment module 402 creates a new hash table 318 to accommodate the particular network flow 116.

There are many other algorithms that the flow assignment module 402 can use to assign a network flow 116 to a hash table 318. In particular, the flow assignment module 402 may utilize any conventional solution to the well-known "bin packing" problem to assign a network flow 116 to a hash table 318.

In yet another way, the flow assignment module 402 can use a manual input from an administrator to assign a network flow 116 to a hash table 318. Thus, the administrator can manually select the composition of a particular hash table 318 to explicitly combine network flows 116 that are known to have little or no overlapped byte frequencies. The administrator can obtain the byte frequency distribution of a particular network flow 116 from the traffic analysis module 404.

The flow assignment module 402 mitigates the impact of a large number of signatures on lookup time because it maps each network flow 116 to a hash table 318 where there is the least overlap between a signature of a network flow 116 and a frequent byte in another network flow 116. Therefore, even if a hash table 318 stores many signatures for different network flows 116, the intrusion detection system 114 can still efficiently search the hash table 318 for a signature that matches a data stream without producing many false hits. Thus, the intrusion detection system 114 is able to scan a data stream and examine the signatures at a higher bandwidth (e.g., at 2 gigabytes per second).

Figure 6:
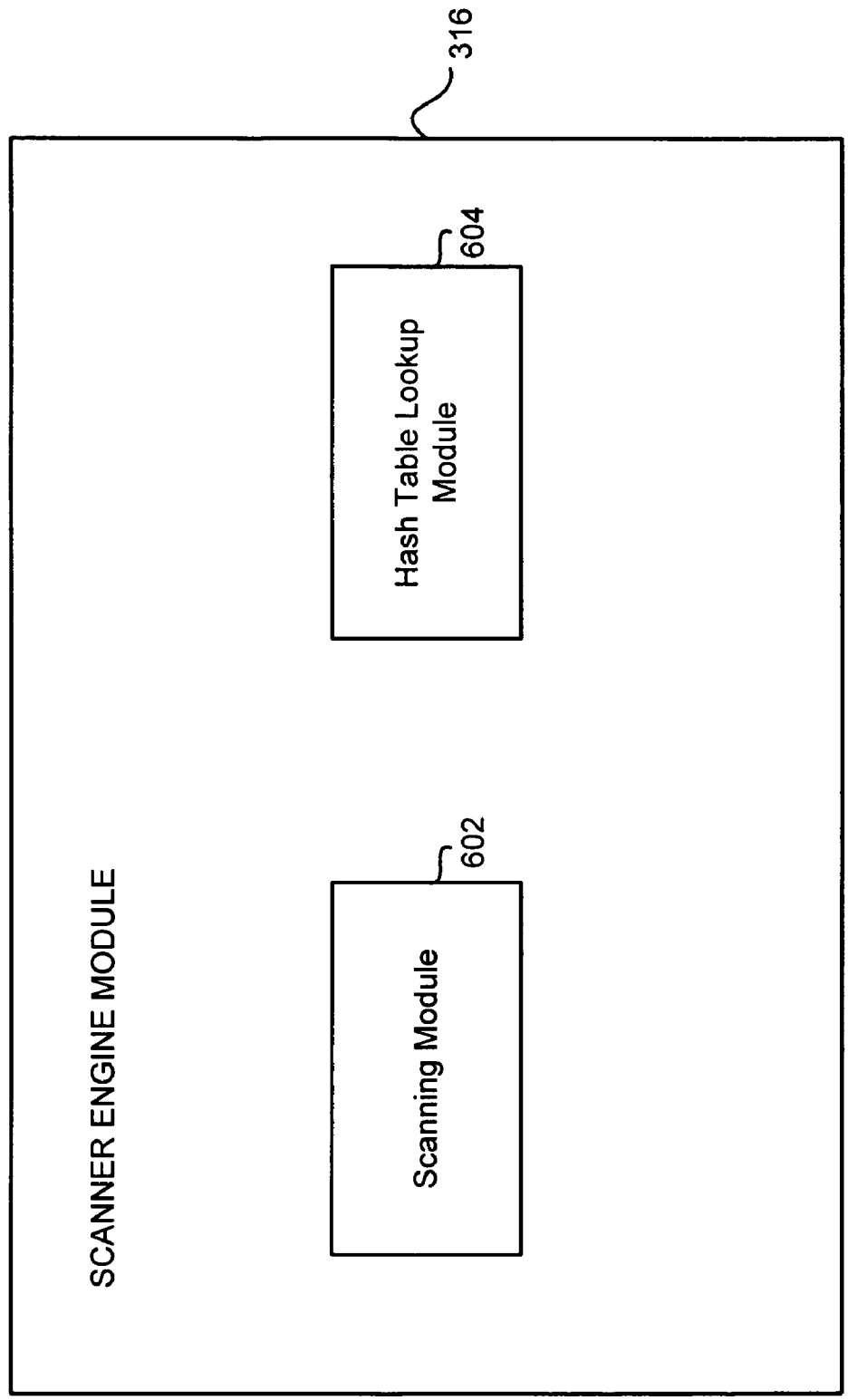
FIG. 6 is a high-level block diagram illustrating modules within a scanner engine module according to an embodiment of the present invention.

Referring again to FIG. 3, the scanner engine module 316 scans each incoming data stream within each network flow and compares the data stream with signatures stored in a hash table 318 to determine if the data stream is malicious. FIG. 6 illustrates that in an embodiment of the invention, the scanner engine module 316 includes a scanning module 602 and a hash table lookup module 604. As a data stream arrives at the intrusion detection system 114, the scanning module 602 scans the stream's data bytes. In one embodiment, the scanning module 602 utilizes a sliding window to scan the data stream a given number of bytes at a time (e.g., two bytes at a time). The hash table lookup module 604 identifies a network flow 116 within which the data stream is being transmitted and examines the flow assignment 320 to identify a hash table 318 to which the network flow 116 is assigned.

The hash table lookup module 604 applies a hash function (i.e., the same hash function used to hash signatures in the hash table 318) to the bytes being scanned in the sliding window and determines if the bytes are hashed to a hash table entry storing a signature. If the bytes are not hashed to a hash table entry storing a signature, the scanning module 602 slides the window to scan the subsequent bytes in the data stream for the hash table lookup module 604 to determine if the subsequent bytes are hashed to a table entry that stores a signature. If the bytes are hashed to a hash table entry storing a signature, the scanning module 602 slides the window to scan the subsequent bytes in the data stream, and the hash table lookup module 604 determines if the entire signature stored in the hash table entry matches the data stream. If the entire signature matches the data stream, the intrusion detection system 114 has detected a malicious activity. Otherwise, the scanning module 602 slides the window to scan the subsequent bytes in the data stream for the hash table lookup module 604 to determine if the subsequent bytes are hashed to a table entry that stores a signature.

If the bytes are hashed to a hash table entry that stores more than one signature, the hash table lookup module 604 will sequentially examine each signature in the entry to determine if any of the signatures matches the data stream.

Figure 7:
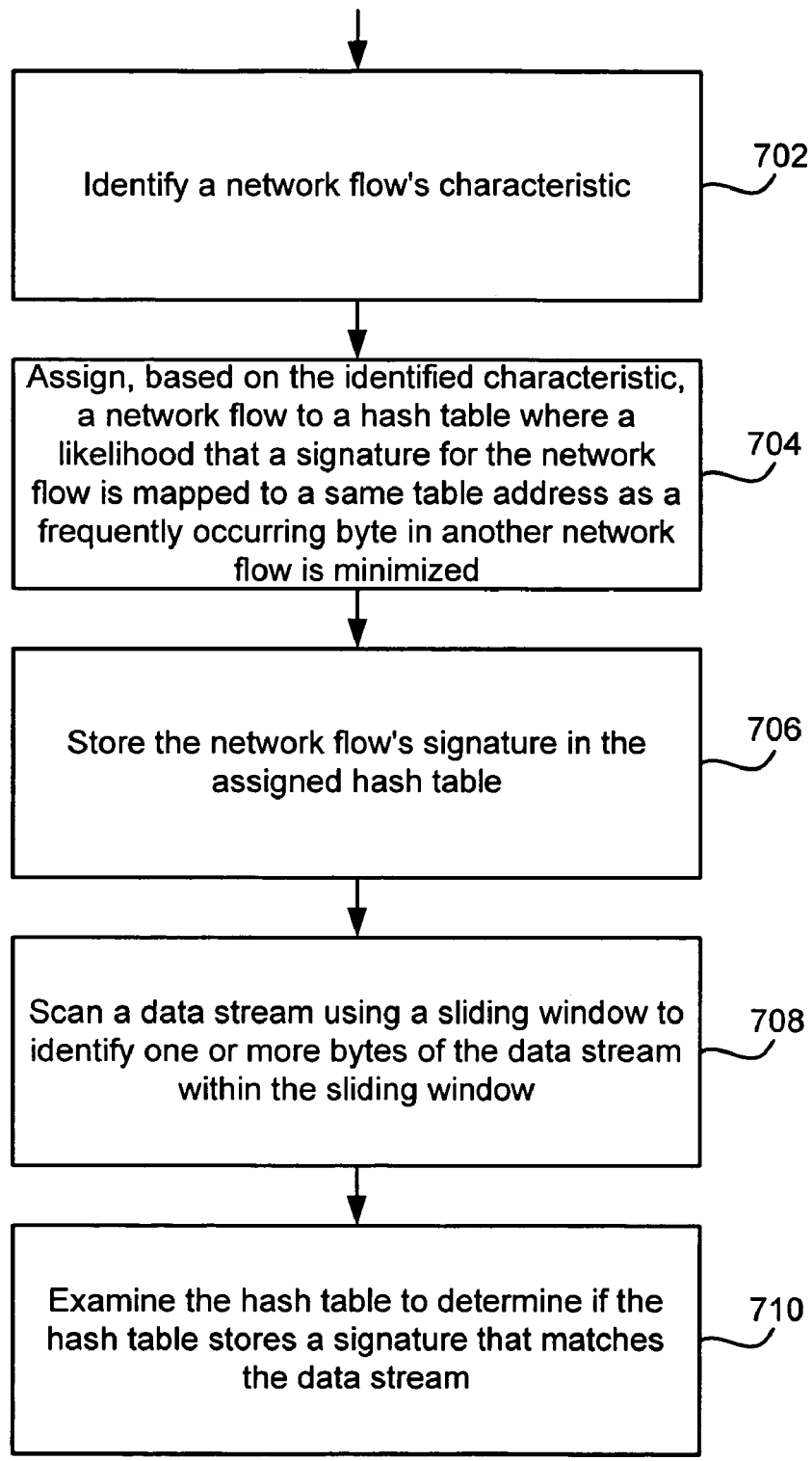
FIG. 7 is a flowchart illustrating steps performed by an intrusion detection system according to an embodiment of the invention.

FIG. 7 is a flowchart illustrating steps performed by the intrusion detection system 114 according to an embodiment of the invention. The figure omits some possible steps. In addition, some embodiments perform different steps in addition to, or instead of, the ones described herein. Furthermore, the order of the steps can vary from that described herein.

The flow assignment module 402 identifies 702 a characteristic of a network flow 116, for example, based on information provided by the traffic analysis module 404. The identified characteristics may include a byte frequency distribution of the network flow 116 and of a signature for the network flow 116. The flow assignment module 402 assigns 704, based on the identified characteristic, a network flow 116 to a hash table 318 where a likelihood that a signature detecting a malicious data stream within the network flow 116 is mapped to a same table address in the same hash table as a frequently occurring byte within another network flow 116 is minimized. The flow assignment module 402 stores 706 the signature for the network flow 116 in the assigned hash table 318. Specifically, the flow assignment module 402 hashes one or more bytes of the signature to identify an entry in the assigned hash table 318 and stores the signature in that entry.

The scanning module 602 scans 708 a data stream using a sliding window to identify one or more bytes of the data stream within the sliding window. The hash table lookup module 604 examines 710 the hash table 318 to determine if the hash table 318 stores a signature that matches the data stream. Specifically, the hash table lookup module 604 hashes the one or more bytes of the data stream within the sliding window to identify an entry in the hash table and determines if the identified entry in the hash table stores a signature. The hash table lookup module 604 further examines the stored signature to determine if the signature is applicable to the current data stream and if the data stream matches the signature.

The above description is included to illustrate the operation of the preferred embodiments and is not meant to limit the scope of the invention. Where the description refers to "one" embodiment and/or "another" embodiment, it will be understood that the description is not necessarily referring to different embodiments. The scope of the invention is to be limited only by the following claims. From the above discussion, many variations will be apparent that would yet be encompassed by the spirit and scope of the invention.

I claim:

1. A computer-implemented method of packing a signature that detects a malicious data stream for an intrusion detection system, the method comprising:
    using a computer processor configured to execute method steps comprising:
        identifying a network flow;
        identifying a plurality of signatures associated with the network flow, the signatures for detecting a malicious data stream within the network flow;
        comparing the signatures of the network flow to byte frequency distributions of a plurality of other network flows, each of the other network flows assigned to one of a plurality of hash tables;
        assigning, based on the comparison, the network flow to a particular hash table selected from the plurality of hash tables, the particular hash table selected to minimize a likelihood that a hash function maps a signature for the network flow to a same table address in the hash table as is mapped a frequently occurring byte within one of the other network flows also assigned to the hash table, wherein each network flow using a critical communications protocol is assigned to a separate hash table, and wherein each network flow using a non-critical communications protocol is assigned to one of the separate hash tables selected to minimize the overlap between a byte frequency distribution of a data stream within the critical communications protocol network flow assigned to the hash table and a byte frequency distribution of a signature for the non-critical communications protocol network flow; and
        storing the plurality of signatures that detect the malicious data stream within the network flow in the assigned hash table.

2. The method of claim 1, wherein storing the signature in the assigned hash table comprises:
    hashing one or more bytes of each of the signatures to identify an entry in the hash table for storing each of the signatures.

3. The method of claim 1, further comprising identifying a byte frequency distribution of a signature for the network flow, wherein the comparing step further comprises comparing the byte frequency distribution of the signature for the network flow with the byte frequency distributions of the other network flows.

4. The method of claim 1, wherein assigning the network flow to the hash table comprises:
    assigning a weight to each of a plurality of network flows based on the byte frequency distribution of each network flow;
    assigning a fixed capacity to each of the plurality of hash tables;
    sorting the plurality of network flows in decreasing order of their weights; and
    iterating through the sorted plurality of network flows to assign each of the sorted plurality of network flows to a first hash table of the plurality of hash tables that has enough capacity for the network flow's assigned weight.

5. The method of claim 1, further comprising:
    scanning a data stream using a sliding window to identify one or more bytes of the data stream within the sliding window;
    hashing the one or more bytes of the data stream within the sliding window to identify an entry in the hash table;
    determining if the identified entry in the hash table stores a signature; and
    examining the stored signature to determine if the data stream matches the stored signature.

6. The method of claim 1, wherein the network flow is represented as a tuple comprising information regarding an origination port that originates the network flow, a destination port that receives the network flow, and a communications protocol used by the network flow to transmit data.

7. A computer system for packing a signature that detects a malicious data stream for an intrusion detection system, the computer system comprising:
    a processor;
    a computer-readable storage medium storing executable software modules that cause the processor to perform steps, comprising:
        identifying a network flow;
        identifying a plurality of signatures associated with the network flow, the signatures for detecting a malicious data stream within the network flow;
        comparing the signatures of the network flow to byte frequency distributions of a plurality of other network flows, each of the other network flows assigned to one of a plurality of hash tables;
        assigning, based on the comparison, the network flow to a particular hash table selected from the plurality of hash tables, the particular hash table selected to minimize a likelihood that a hash function maps a signature for the network flow to a same table address in the hash table as is mapped a frequently occurring byte within one of the other network flows also assigned to the hash table, wherein each network flow using a critical communications protocol is assigned to a separate hash table, and wherein each network flow using a non-critical communications protocol is assigned to one of the separate hash tables selected to minimize the overlap between a byte frequency distribution of a data stream within the critical communications protocol network flow assigned to the hash table and a byte frequency distribution of a signature for the non-critical communications protocol network flow; and storing the plurality of signatures that detect the malicious data stream within the network flow in the assigned hash table.

8. The system of claim 7, wherein the flow assignment module hashes one or more bytes of each of the signatures to identify an entry in the hash table for storing each of the signatures.

9. The system of claim 7, further comprising:
a traffic analysis module for providing the byte frequency distribution of the network flow to the flow assignment module.

10. The system of claim 7, wherein the flow assignment module is adapted to:
assign weight to each of a plurality of network flows based on the byte frequency distribution of each network flow;
assign a fixed capacity to each of the plurality of hash tables;
sort the plurality of network flows in decreasing order of their weights; and
iterate through the sorted plurality of network flows to assign each of the sorted plurality of network flows to a first hash table of the plurality of hash tables that has enough capacity for the network flow's assigned weight.

11. The system of claim 7, further comprising:
a scanning module for scanning the data stream using a sliding window to identify one or more bytes of the data stream within the sliding window; and
a hash table lookup module for:
hashing the one or more bytes of the data stream within the sliding window to identify an entry in the hash table,
determining if the identified entry in the hash table stores a signature, and
examining the stored signature to determine if the data stream matches the stored signature.

12. The system of claim 7, wherein the network flow is represented as a tuple comprising information regarding an origination port that originates the network flow, a destination port that receives the network flow, and a communications protocol used by the network flow to transmit data.

13. A computer program product having a computer-readable storage medium having embodied thereon program code for packing a signature that detects a malicious data stream for an intrusion detection system, the program code comprising:

a flow assignment module for:
identifying a network flow;
identifying a plurality of signatures associated with the network flow, the signatures for detecting a malicious data stream within the network flow;
comparing the signatures of the network flow to byte frequency distributions of a plurality of other network flows, each of the other network flows assigned to one of a plurality of hash tables;
assigning, based on the comparison, the network flow to a particular hash table selected from the plurality of hash tables, the particular hash table selected to minimize a likelihood that a hash function maps a signature for the network flow to a same table address in the hash table as is mapped a frequently occurring byte within one of the other network flows also assigned to the hash table, wherein each network flow using a critical communications protocol is assigned to a separate hash table, and wherein each network flow using a non-critical communications protocol is assigned to one of the separate hash tables selected to minimize the overlap between a byte frequency distribution of a data stream within the critical communications protocol network flow assigned to the hash table and a byte frequency distribution of a signature for the non-critical communications protocol network flow; and
storing the plurality of signatures that detect the malicious data stream within the network flow in the assigned hash table.

14. The computer program product of claim 13, wherein the flow assignment module hashes one or more bytes of each of the signatures to identify an entry in the hash table for storing each of the signatures.

15. The computer program product of claim 13, wherein the program code further comprises:
a traffic analysis module for providing the byte frequency distribution of the network flow to the flow assignment module.

16. The computer program product of claim 13, wherein the flow assignment module is adapted to:
assign a weight to each of a plurality of network flows based on the byte frequency distribution of each network flow;
assign a fixed capacity to each of the plurality of hash tables;
sort the plurality of network flows in decreasing order of their weights; and
iterate through the sorted plurality of network flows to assign each of the sorted plurality of network flows to a first hash table of the plurality of hash tables that has enough capacity for the network flow's assigned weight.

17. The computer program product of claim 13, wherein the program code further comprises:
a scanning module for scanning the data stream using a sliding window to identify one or more bytes of the data stream within the sliding window; and
a hash table lookup module for:
hashing the one or more bytes of the data stream within the sliding window to identify an entry in the hash table,
determining if the identified entry in the hash table stores a signature, and
examining the stored signature to determine if the data stream matches the stored signature.

* * * * *